US007856885B1

(12) United States Patent
Bhansali et al.

(10) Patent No.: US 7,856,885 B1
(45) Date of Patent: Dec. 28, 2010

(54) REINFORCED PIEZORESISTIVE PRESSURE SENSOR

(75) Inventors: Shekhar Bhansali, Tampa, FL (US); Lawrence C. Langebrake, Seminole, FL (US); Shreyas Bhat, Tampa, FL (US)

(73) Assignee: University of South Florida, Tampa, FL (US)

( * ) Notice: Subject to any disclaimer, the term of this patent is extended or adjusted under 35 U.S.C. 154(b) by 66 days.

(21) Appl. No.: 12/276,465

(22) Filed: Nov. 24, 2008

Related U.S. Application Data

(63) Continuation-in-part of application No. 11/379,270, filed on Apr. 19, 2006, now Pat. No. 7,456,638.

(51) Int. Cl.
*G01L 9/06* (2006.01)
(52) U.S. Cl. .......................................... 73/721; 73/715
(58) Field of Classification Search ........................ None
See application file for complete search history.

(56) References Cited

U.S. PATENT DOCUMENTS

| 4,838,088 | A * | 6/1989 | Murakami | .................. | 73/724 |
| 6,041,659 | A * | 3/2000 | Wilda et al. | ................... | 73/720 |
| 6,293,154 | B1 * | 9/2001 | Kurtz | .......................... | 73/727 |
| 7,441,470 | B2 * | 10/2008 | Morimoto | .............. | 73/862.045 |
| 2004/0255682 | A1 * | 12/2004 | Petrova et al. | ................ | 73/715 |
| 2005/0252302 | A1 * | 11/2005 | Muchow et al. | ............... | 73/754 |
| 2009/0120194 | A1 * | 5/2009 | Rahn et al. | ..................... | 73/715 |

OTHER PUBLICATIONS

Mohan, A.; Malshe, A.P.; Aravamudhan, S.; Bhansali, S. "Piezoresistive MEMS pressure sensor and packaging for harsh oceanic environment." Electronic Components and Technology Conference. 2004. Jun. 1-4, 2004. vol. 1. pp. 948-950.

* cited by examiner

*Primary Examiner*—Andre J Allen
(74) *Attorney, Agent, or Firm*—Molly L. Sauter; Smith & Hopen, P.A.

(57) ABSTRACT

A MEMS-based silicon pressure sensor for the ocean environment is presented. The invention is a multiple diaphragm piezoresistive pressure sensor for measuring the pressure of a liquid, comprising an inner deformable diaphragm formed on a silicon substrate, the inner deformable diaphragm having a first thickness an outer deformable diaphragm formed on the silicon substrate, the outer deformable diaphragm having a second thickness which is greater than the first thickness, positioned below the inner deformable diaphragm to support the inner deformable diaphragm, a first piezoresistive bridge embedded in the inner deformable diaphragm, a second piezoresistive bridge embedded in the outer deformable diaphragm and possibly a third piezoresistive bridge embedded in the silicon substrate to compensate for temperature variations.

21 Claims, 7 Drawing Sheets

REINFORCED PIEZORESISTIVE PRESSURE SENSOR

CROSS REFERENCE TO RELATED APPLICATIONS

This application claims priority to currently pending U.S. patent application Ser. No. 11/379,270, entitled, "MEMS based Conductivity-Temperature-Depth Sensor for Harsh Oceanic Environment", filed Apr. 19, 2006 and to U.S. Provisional Patent Application 60/672,802, entitled, "Conductivity Sensor for Marine Applications", filed Apr. 19, 2005.

BACKGROUND OF INVENTION

Current understanding of physical and biogeochemical processes from coastal to deep-sea environment is limited. This is mainly due to the constraints in current sensing techniques. The major goal of ocean research is to develop systems that allow measurement of significant and complementary ocean parameters throughout large volumes and over large time spans. To this end researchers have made significant investments in remote sensing, AUVs, ROVs and buoys. These technologies sense local environmental variables at a singe point in space-time. However, the use of multiple vehicles improves the measurement quality. But, the gain from higher spatial sampling frequency is directly related to the number of additional vessels used. Using more support vessels, whether AUVs or ships, will add to the cost. While remote sensing and in situ buoy systems have provided part of the solution, both have limitations in terms of energy consumption and non-steady responses.

In addition to monitoring the important ocean processes, pressure/depth sensors also find use in maritime/homeland port security. Detecting the movement of surface vessels such as ships, boats, or buoys and subsurface systems such as submarines, unmanned submerged vehicles, mining systems or surveillance systems have become important in current times. Conventional techniques involve either an acoustic or nonacoustic method. Even though these are highly effective in single point/sector detection in time-space, their ability for wide area surveillance/dynamic monitoring is extremely limited. There are several emerging techniques for detecting submarines ranging from direct detection of submarine structure to indirect techniques through analysis of the effect the submarine has on the surrounding ocean environment (wave or thermal variations). One such indirect method involves measurement of environmental variations due to the submerged vehicle such as water/air temperature changes versus depth, pressure variations and wave height changes. The physical surface characteristics range from a wake developed by the moving vessel, detectable on the surface to generation of internal waves, which are manifested through subtle surface effects. However, these effects are highly variable, dependent on the vessel's operational parameters such as speed, size and depth. Of all the physical effects, detection of internal waves is the most realistic technique for a wide area, as other effects are severely constrained by vessel speed and depth. Internal waves are periodic disturbances in temperature and density (or pressure, $P=\rho gD$, where $\rho$ is the density of water and P is the pressure) of water at depths, where temperature drops and density rises sharply with increasing depth. In short, measuring and mapping (1) pressure and wave variations in sea surface/sub-surface and (2) temperature changes in water and atmosphere will be an indispensable surveillance tool to detect the movement of both surface and submerged vessels. Another application for pressure/depth sensors is tsunami wave detection at thousands of meters in water, with very high resolution (<0.001% FS), accuracy, stability, and insensitivity to environmental disturbances. Commercial single diaphragm piezoresistive pressure/depth sensors are capable of measuring up to 10,000 bar with an accuracy of 0.015% of full scale.

Accordingly, what is needed in the art is an improved piezoresistive pressure sensor for dynamic, dense and distributed ocean sensing applications having improved sensitivity and wider full scale span compared to the conventional single diaphragm piezoresistive pressure sensors currently known in the art.

SUMMARY OF INVENTION

In accordance with the present invention is provided a piezoresistive pressure sensor array comprising of a double diaphragm, with the outer diaphragm acting both as reinforcement and sensing structure along with an inner sensing diaphragm and a temperature compensation bridge.

The present invention provides a system that can overcome the limitations in the deployment of environmental measuring parameters for sea-space observations. In the present invention, the design, fabrication and testing of a Micro-Electro-Mechanical-System (MEMS) based Conductivity-Temperature-Depth (CTD) sensor. MEMS based sensors offer miniaturization, which is useful for distributed networks with large and dynamic sampling volumes and offer high measurement accuracy.

In accordance with the present invention is provided an apparatus for measuring conductivity, temperature and depth of a liquid. In an advantageous embodiment the apparatus includes a parallel plate capacitive based conductivity microsensor for measuring the conductivity of the liquid, a doped silicon resistive temperature microsensor for measuring the temperature of the liquid and a multiple diaphragm piezoresistive microsensor for measuring the pressure of the liquid.

In a particular embodiment the parallel plate capacitive based conductivity microsensor has an upper chargeable plate and a lower chargeable plate positioned in parallel relation to each other and separated by a plate gap such that the liquid to be measured flows within the plate gap. The upper chargeable plate and a lower chargeable plate can further include two guard rings, each of the two guard rings positioned to surround one of each of the parallel plates.

In a specific embodiment the upper parallel plate further has two copper plates fabricated on a substrate wherein each of the copper plates measures about 10 mm by 10 mm and are about 250 μm thick, and are separated from each other by a spacing of about 1 mm. In an additional embodiment the lower parallel plate is a copper plate fabricated on a substrateIn certain embodiments the two guard rings are about 5 mm thick and separated from the parallel plates by about 400 μm.

In addition to the electrodes the conductivity microsensor further includes supply circuitry coupled to the two parallel plates and output circuitry coupled to the two parallel plates for measuring the conductivity of the liquid.

In advantageous embodiments the plate gap is provided by strips of silicon wafer bonded between the substrate of the upper parallel plate and the substrate of the lower parallel plate.

In a particular embodiment the parallel plates are coated with a polymer to physically and electrically isolate them from the liquid. In certain embodiments the doped silicon resistive temperature microsensor is doped with gold.

The doped silicon resistive temperature microsensors can further include an n-type silicon substrate area diffused with gold regions using e-beam evaporation and heating. In certain embodiments the apparatus can further include ohmic contacts positioned to contact the gold diffused regions.

The present invention also includes a multiple diaphragm piezoresistive pressure microsensor to detect the deflection of the membranes, induced by the applied pressure of the liquid and converts the deflections into an electrical output using a piezoresistor to measure the pressure of the liquid. The pressure measurement of the liquid can be converted to depth according to the formula:

$$P=\rho h g$$

where, P is the pressure, $\rho$ is the density of water, h is the depth in water and g is acceleration due to gravity.

In certain embodiments the multiple diaphragm piezoresistive pressure microsensor further includes four square silicon diaphragms of about 1000 mm in area supported by a thicker square diaphragm of about 1500 mm in area, the silicon diaphragms having a thickness of between about 5 μm and 30 μm and fabricated on a common substrate to measure linearly the pressure range of the liquid.

In a specific embodiment the piezoresistors are small regions of silicon diffused with p-type or n-type elements that undergo a change in resistance due to the applied pressure on the diaphragms. The change in resistance of the piezoresistor can be measured as a voltage output by means of a wheatstone bridge.

In order to communicate the collected measurements from the microsensors, the present invention includes a data-acquisition and processing system connected to receive measurement signals from the conductivity microsensor, the temperature microsensor and the pressure microsensor. To protect the apparatus from the environment a substantially watertight casing can be employed.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

The all-silicon MEMS multi sensor consists of a capacitive based conductivity sensor, a gold doped temperature sensor and bulk micromachined piezoresistive pressure/depth sensor. These sensors are capable of operating over a wide dynamic range (0-500 m) with a resolution better than 1%. The advantages of using MEMS based silicon sensors are: 1) negligible creep and fatigue from hysteresis, 2) capable of integration and batch fabrication and 3) easily interface to electronic circuits.

A. Conductivity Sensor

Figure 1:
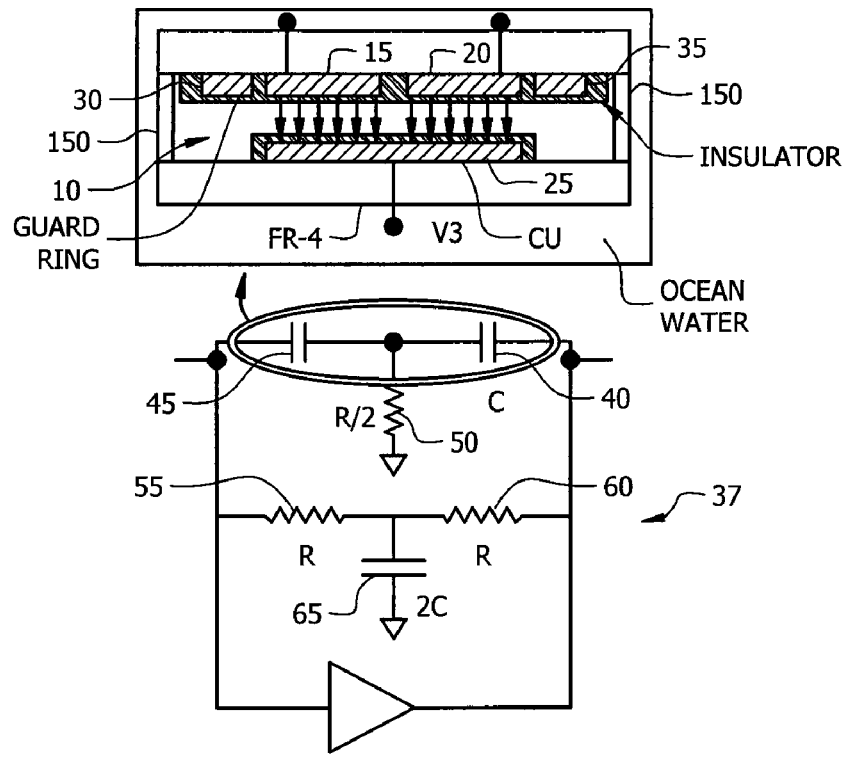
FIG. 1 is a schematic diagram illustrating the parallel-plate arrangement for measuring conductivity.

Conventional conductivity sensors consist of toroidal coils for measurements. An inherent drawback of such system is the external field. A significant portion of the measuring field is external to the device and hence, any particle/field in the vicinity of the device tends to alter the measuring field resulting in measurement errors. The problem of external fields can be overcome by making use of a parallel two plate arrangement where the test specimen (ocean water) is allowed to flow through the plate gap. FIG. 1 illustrates the parallel plate arrangement for measuring conductivity of water. In this capacitive arrangement, most of the electric field 10 is confined to the region between the two charged plates 15, 20, 25. The only fields external to such a system are the fringe fields at the corners of the plates 15, 20, 25. These are minimized by incorporating guard rings 30, 35 around the plates 15, 20, 25. The guard rings 30, 35 divert the fringe fields from the area of interest. In particular, the capacitor arrangement forms a part of a larger twin-T oscillator circuit 37. The twin-T oscillator 37 uses a high-pass arm consisting of two equal capacitors 40, 45 and a resistor 50, and a low pass arm consisting of two resistors 55, 60 and a capacitor 65. In addition, the separation between the charged plates 15, 20, 25 establishes a plate gap with is provided by placing strips of silicon wafer 150 bonded between the substrate of the upper parallel plate and the lower parallel plate.

For sustained oscillations, the capacitors 40, 45, 65 and resistors 50, 55, 60 should be matched according to the relation, $R_1=R_2=2R_3=R$ and $C_1=C_2=C_3/2=C$. The frequency of oscillation is thus, controlled by the resistors 50, 55, 60 and capacitors 40, 45, 65 in the twin-T arrangement 37, and given by the expression, $$F=\frac{1}{2}*\pi*R*C \qquad (2.1)$$

Thus, the change in concentration of the analyte changes the dielectric constant of the solution. This is because of the fact that when salts are added to water, 'hydration' of the salt ions takes place and it becomes harder for the ions to orient themselves in the direction of the electric field. This change in dielectric constant corresponds to a change in the capacitance of the sensor, which in turn corresponds to a shift in the oscillator's frequency.

B. Temperature Sensor

Unlike conventional Resistance Temperature Detectors (RTD), which are expensive and require elaborate packaging, our approach uses a low-cost, simple, packaged, board range gold doped silicon temperature sensor.

The temperature sensing principle is based on the phenomena of resistivity change in bulk Si with temperature. In order to construct a sensor with high resolution and sensitivity, the resistivity of silicon was increased by controlled addition of deep impurities. The resistivity of silicon substrate was increased by controlled co-doping of Si with a deep donor (DD) and a deep acceptor (DA). Almost all transition metals such as copper, gold, iron are known to introduce a pair of DD and DA in the silicon bandgap. Gold (Au) is a stable material (density of 19.3 g/cm$^3$ and melting point of 1060° C., but very fast diffuser and forms a deep-impurity level in silicon. Au dissolves substitutionally and diffuses interstitially in silicon at temperatures above 800° C., also known as the kick-out mechanism. The resistivity of pure silicon becomes high when the gold concentration exceeds the shallow donor concentration. This makes temperature measurement highly sensitive.

C. Pressure/Depth Sensor

Several techniques have been routinely used in the past to measure pressure in the marine environment. In general, the pressure sensor design is based on a flexible membrane as the spring element for the sensing pressure. The deflection of the membrane, induced by the applied pressure, is converted into an electrical output through a component that is sensitive to diaphragm deflection (capacitive coupling) or associated stresses (piezoresistors, strain gauges). The temperature compensated pressure measurement can be readily converted to depth using:

$$P = \rho h g \quad (2.2)$$

where, P is the pressure, $\rho$ is the density of water, h is the depth in water and g is acceleration due to gravity. The piezoresistive pressure sensors were one of the first MEMS products put into mass production. Piezoresistive pressure sensors using silicon as the structural material and piezoresistivity as sensing mechanism are fabricated either by bulk or by surface micromachining techniques.

In this method of pressure measurement the pressure is applied to one side of a deformable diaphragm. The deformation is sensed on the diaphragm using piezoresistors. In general, piezoresistivity is a material property in which the bulk resistivity is influenced by the mechanical stress applied to the material. The resistivity of a material depends on the internal atom positions and their motions. Strains change these arrangements and hence, the resistivity. High piezoresistivity exhibited by single crystal silicon, combined with its excellent mechanical properties, makes silicon particularly suited for the fabrication of electromechanical pressure sensors with substantially enhanced output.

Figure 2:
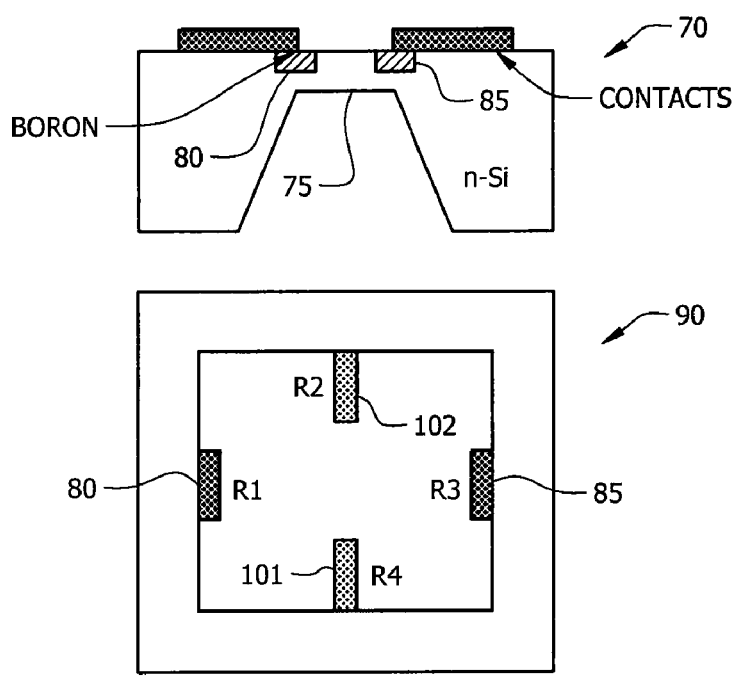
FIG. 2 shows a cross-sectional and top view of a single diaphragm piezoresistive pressure sensor.

FIG. 2 shows a prior art silicon based pressure sensors 70 consisting of a silicon diaphragm 75 with small regions 80, 85 diffused with p-type or n-type elements (R1, R2, R3 and R4) 80, 85, 101, 102 that act as piezoresistors 80, 85, 101, 102. These piezoresistors 80, 85, 101, 102 undergo a change in resistance due to the applied pressure.

When a differential pressure is applied across the device, the thin diaphragm will deflect either downward or upward, resulting in expansion or compression of the piezoresistors. The resistance change caused by this stress is measured as a voltage output by means of a Wheatstone bridge configuration. Thus, the output response from the Wheatstone bridge is proportional to the applied differential pressure.

In the present invention, the pressure sensor is based on the piezoresistive property of silicon implanted with p-type (boron) dopants. The resistivity of a material depends on the internal atom positions and their motions. Strains change the atom arrangement and hence, the bulk resistivity. In particular, p-type dopants (i.e. boron) in crystal silicon exhibit high piezoresistivity with excellent mechanical properties, enhanced output, linearity and reliability.

In a particular embodiment of the present invention, the resistance change in piezoresistors is measured using a Wheatstone bridge network to reduce cross-sensitivity to temperature. However, even if all the piezoresistors are evenly matches and variations with temperature are linear, it will still create pressure offsets. Therefore, in an additional embodiment, along with the double piezoresistive network, a third Wheatstone bridge is used to compensate for temperature variations.

In the present invention, a double diaphragm design is used for the pressure sensor. In this double diaphragm design, a thin inner diaphragm is used in combination with a thinner outer diaphragm. By using a thicker outer diaphragm as reinforcement structure, or by edge smoothing, the sharp peak stresses at the inner diaphragm edges can be avoided. This is turn improves the maximum operating pressure capability. Also, since reinforcements have much higher stiffness than the inner diaphragm, they provide increased mechanical support. This opens the possibility for designing inner diaphragms much thinner than that possible with single diaphragm design. In general a square diaphragm of length L and thickness H, sensitivity S for input pressure P is defined as:

$$S = \frac{V_0}{V_s} = C\left(\frac{L}{H}\right)^2 P \quad (2.3)$$

It is therefore, advantageous to use much thinner inner diaphragms, H (with adequate reinforcements) to achieve higher sensitivity, S. Also, by using piezo elements in the outer diaphragm, the operating range can be further increased. In all, by using the reinforced design both the operating range capability and sensitivity are increased at the same time.

The double diaphragm pressure sensors of the present invention are designed to concurrently achieve both higher sensitivity and wider full scale span (up to 1000 psi) compared to single diaphragm designs known in the art.

Figure 3:
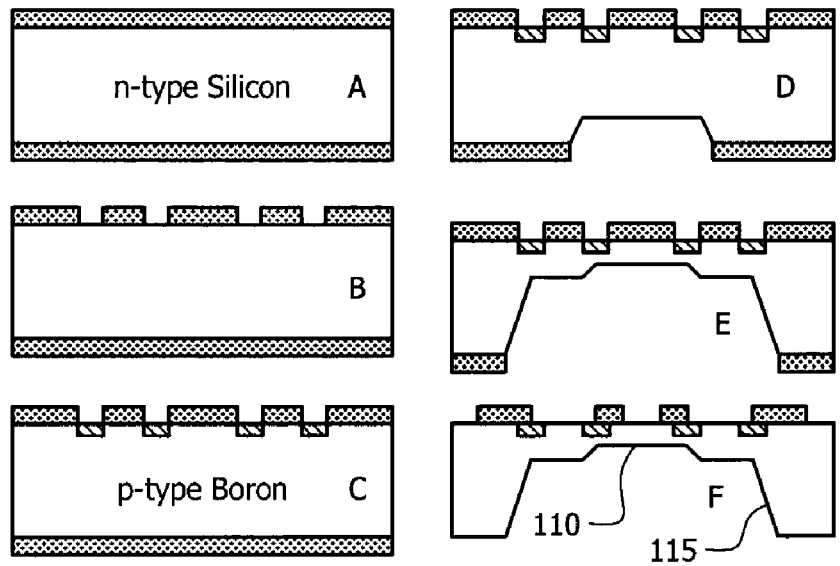
FIG. 3 is an illustration of the pressure sensor fabrication sequence.

With reference to FIG. 3, a silicon piezoresistive bulk-micromachined pressure/depth sensor of varying diaphragm thickness (5-30 µm) was fabricated on a single substrate to measure linearly the pressure range. In this particular embodiment, each individual sensor was designed as a square diaphragm (1000 micrometer) 110 supported by a thicker square diaphragm (1500 micrometer) 115 to transfer the larger stresses to the outer thicker rim and to have a highly sensitive and large operating range.

Figure 12:
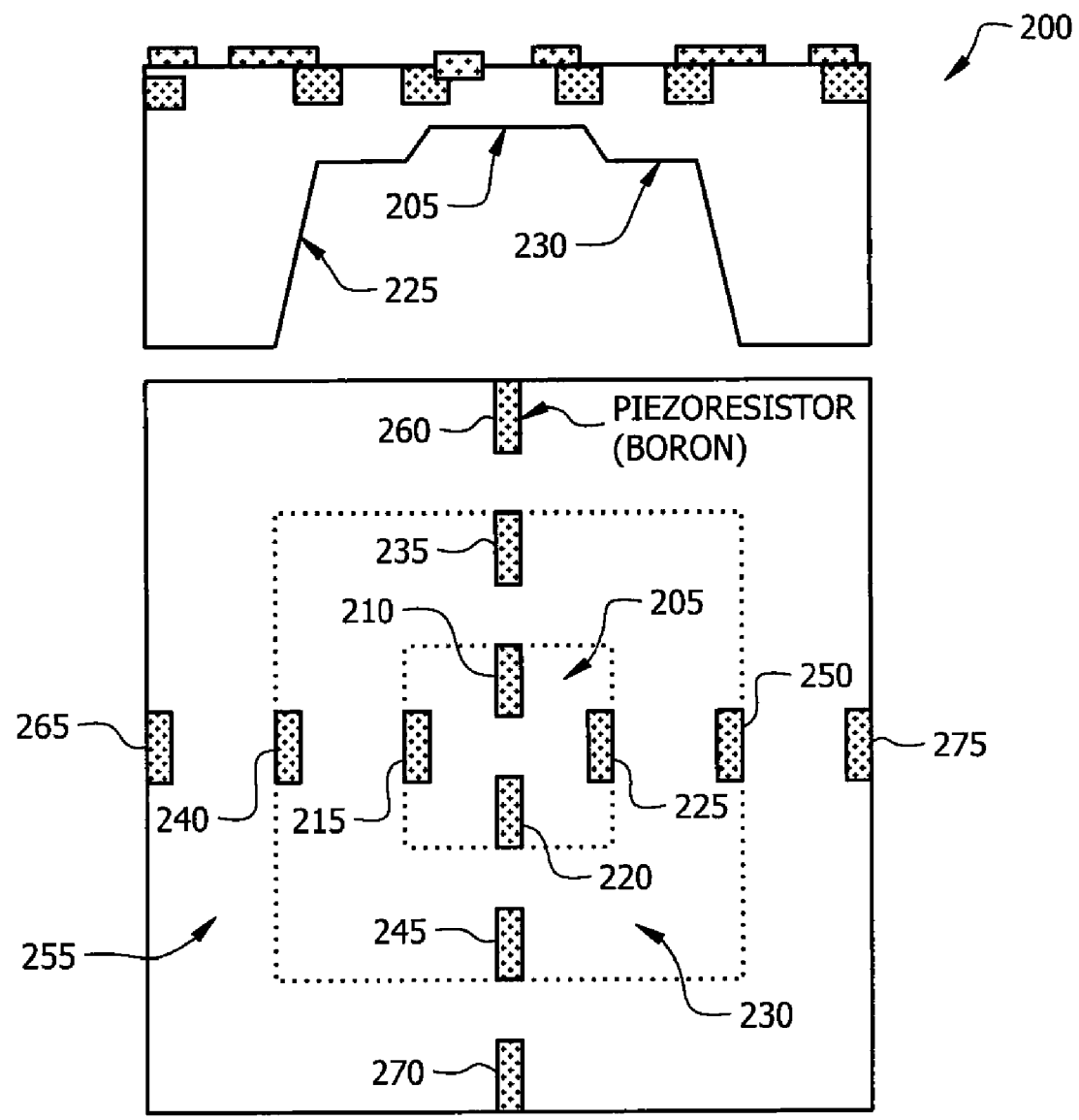
FIG. 12 illustrates a double diaphragm, Wheatstone bridge pressure sensor in accordance with an embodiment of the present invention.

FIG. 12 illustrates an additional embodiment of the double diaphragm/Wheatstone bridge pressure sensor in accordance with the present invention. In this embodiment, pressure sensor 200 consists of a thin inner silicon diaphragm 205 supported by a thicker outer silicon diaphragm 230. The inner diaphragm 205 includes regions diffused with p-type or n-type elements 210, 215, 220, 225 that act as piezoresistors in a Wheatstone bridge configuration. The outer diaphragm 230 includes regions diffused with p-type or n-type elements 235, 240, 245, 250 that act as in a Wheatstone bridge configuration. These piezoresistors 210, 215, 220, 225, 235, 240, 245, 250 undergo a change in resistance due to the applied pressure on the diaphragms.

In this embodiment, each individual die is designed as a square diaphragm with a piezo bridge supported by a thicker square diaphragm, also with a piezo bridge. As such, the larger stresses/pressure is transferred to the outer, thicker diaphragm. When operating under lower pressures, the inner diaphragm deflects and the outer remain insensitive. At higher pressures, the inner diaphragm is in tension and the change in resistance of the outer diaphragm (under stress) is measured.

In an additional embodiment, piezoresistors 260, 265, 270, 275 in the form of a bridge are also implanted in the silicon bulk 255, away from the diaphragm area, to help compensate for temperature variations.

In the case of the double diaphragm pressure sensor, the outer diaphragm acts as a support structure by absorbing the peak stresses under pressure. This result is due to the stiffness coefficient of the outer diaphragm which is higher than that of the inner diaphragm. In a particular embodiment, in order to achieve the most effective stress transfer from the inner to the outer diaphragm, the ratio of outer to inner diaphragm should be greater than 3.

Fabrication of the MEMS-Based CTD Sensor

The different sensor components were fabricated using conventional MEMS/silicon micromachining techniques. A prototype conductivity sensor was first constructed to validate the design issues. The conductivity sensor was fabricated on a pre-sensitized single side copper FR-4 substrate, having a 250 μm thick copper layer. Copper plates (each measuring 10 mm×10 mm), were patterned adjacent to each other with 1 mm spacing. The guard rings 5 mm thick were incorporated around the measuring plates and was separated from them by 400 μm. These were then placed in parallel to the third plate. A gap was maintained by bonding, two strips of silicon wafer between the two substrates. The plates are patterned on the substrate using standard PCB fabrication techniques. The contacts were made by soldering the wires to the copper plates. The plates were physically and electrically isolated from the medium, by coating them with a 10 μm thick polymer.

Figure 11:
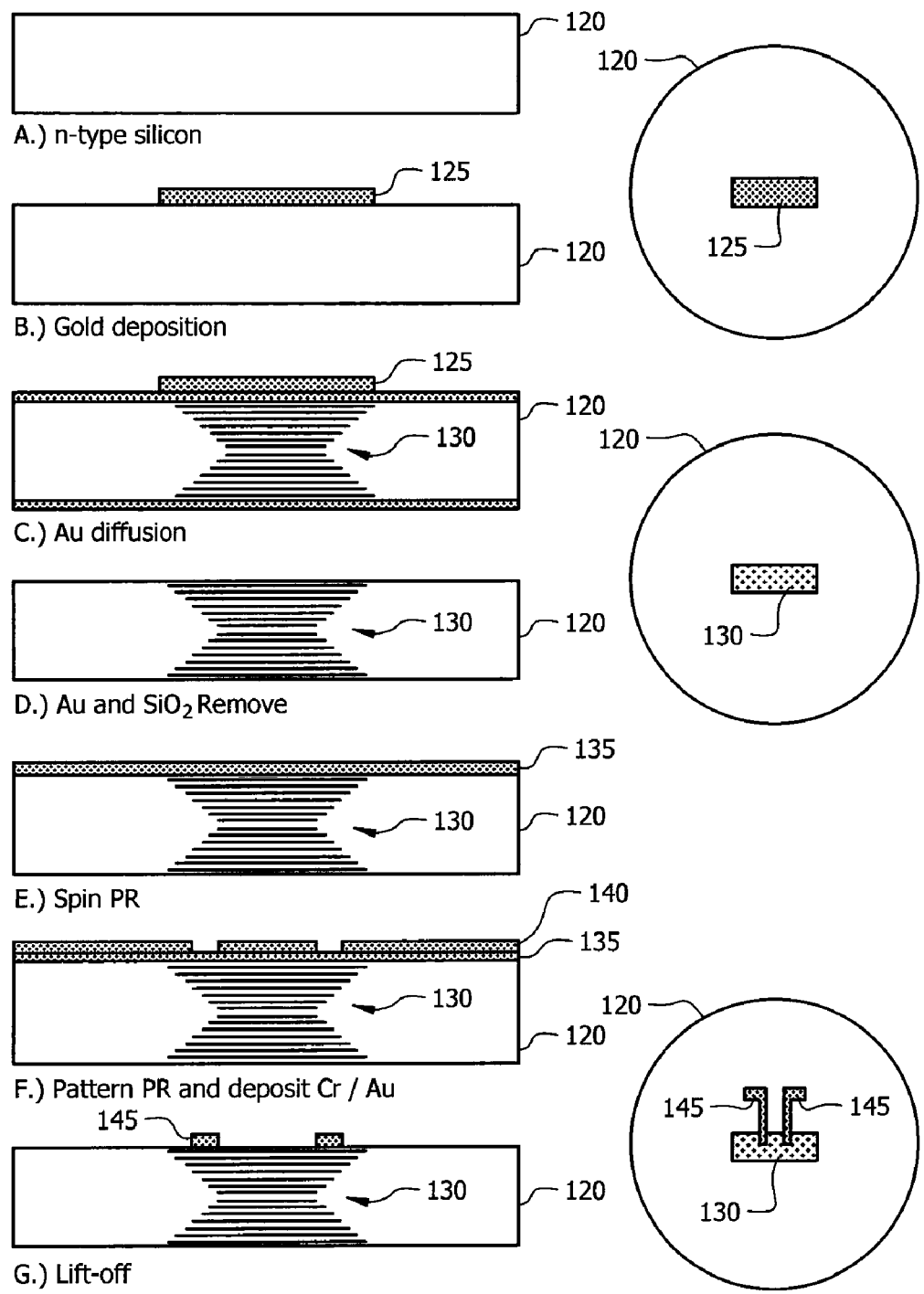
FIG. 11 illustrates the fabrication process of the temperature sensor in accordance with an embodiment of the present invention.

With reference to FIG. 11, in the case of temperature sensor, a n-type (phosphorous doped) silicon substrate 120 was used. This was followed by deposition of 25 nm of Au 125 on a 1 cm×0.5 cm area of silicon using e-beam evaporation technique. It was found that this area was sufficient to give high resistance and hence high resolution. Next, diffusion 130 was done in an oxygen rich furnace at 1100° C. This was followed by Au etch to remove any surface Au and oxide etch for 20 minutes. Then, ohmic contacts 145 were patterned by standard photolithography technique 135, 140 on the Au regions.

The fabrication of piezoresistive pressure sensor involves the fabrication of a silicon diaphragm by bulk etching of (100) n-type silicon using timed etching approach. The piezoresistors were formed by diffusing p-type dopant (boron) close to the edges of the diaphragm. The piezoresistors were connected in a wheatstone bridge configuration. Two piezoresistors are oriented so that they can sense stress in a direction parallel to the current flow, and other two are placed to sense stress perpendicular to current flow. FIG. 3 shows the cross-sectional fabrication sequence for a multiple diaphragm pressure sensor. This type of pressure sensor has two diaphragms of thickness 25 and 35 μm respectively and four piezoresistors in each diaphragm to sense the deformation. First, the n-type silicon is oxidized (A), then by standard photolithography and etching techniques oxide areas are opened up for boron diffusion (B). Next, p-type element (boron) is diffused by ion-implantation and annealed (C), this followed by oxide etching for formation of the diaphragm (D), two diaphragms 110, 115 of different thickness were formed by silicon bulk micromachining technique (E). Finally, the contacts are formed for measurements purposes (F).

Figure 4:
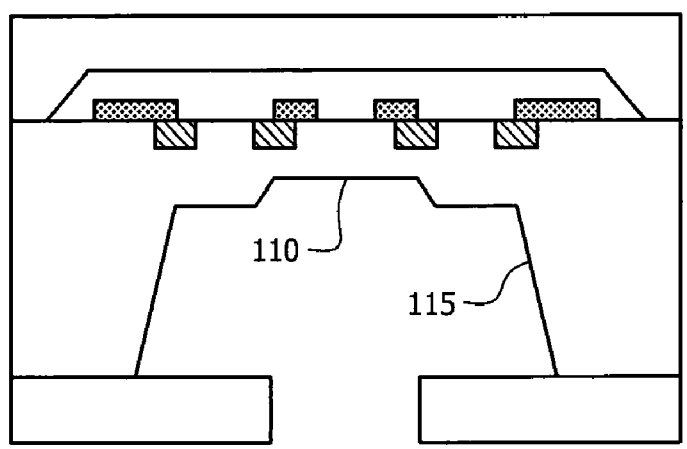
FIG. 4 is a schematic showing the packaged piezoresistive pressure sensor.
Figure 5:
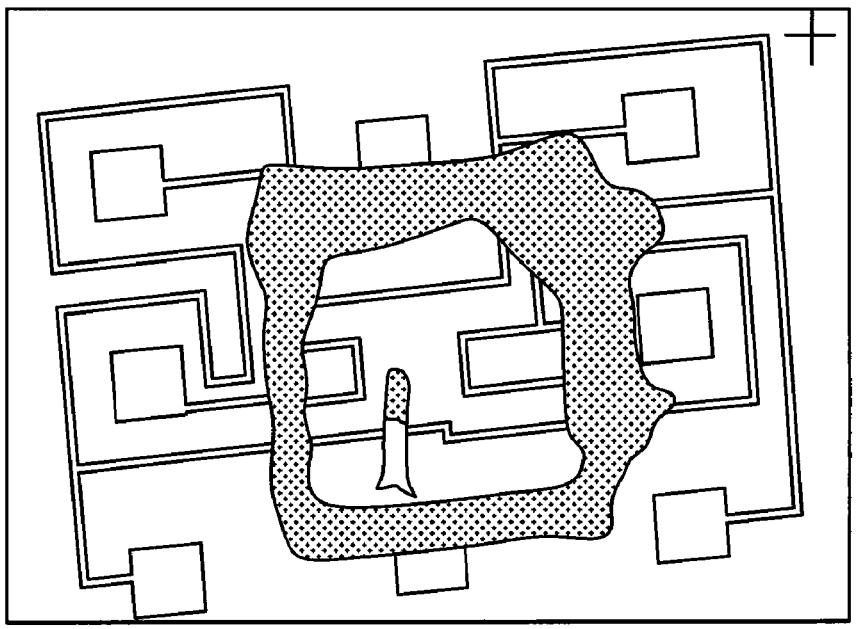
FIG. 5 is a photograph of a packaged multiple diaphragm piezoresistive pressure sensor.

The next step in the pressure sensor fabrication is to form the package to protect the sensor for the harsh ocean environment. This was accomplished by forming a cavity above the diaphragm using a thick pyrex glass. FIG. 4 shows the schematic of the package and FIG. 5 shows actual packaged pressure sensor. Next, the interconnections were drawn out of the bond pads by filling the vias with conductive epoxy. This was then flip-chipped on to a bottom board with ports for sensing pressure. The whole assembly was coated with protective paint, Lumiflon®. This protects the device from harsh environmental conditions.

Performance of the MEMS-Based CTD Sensor

Figure 6:
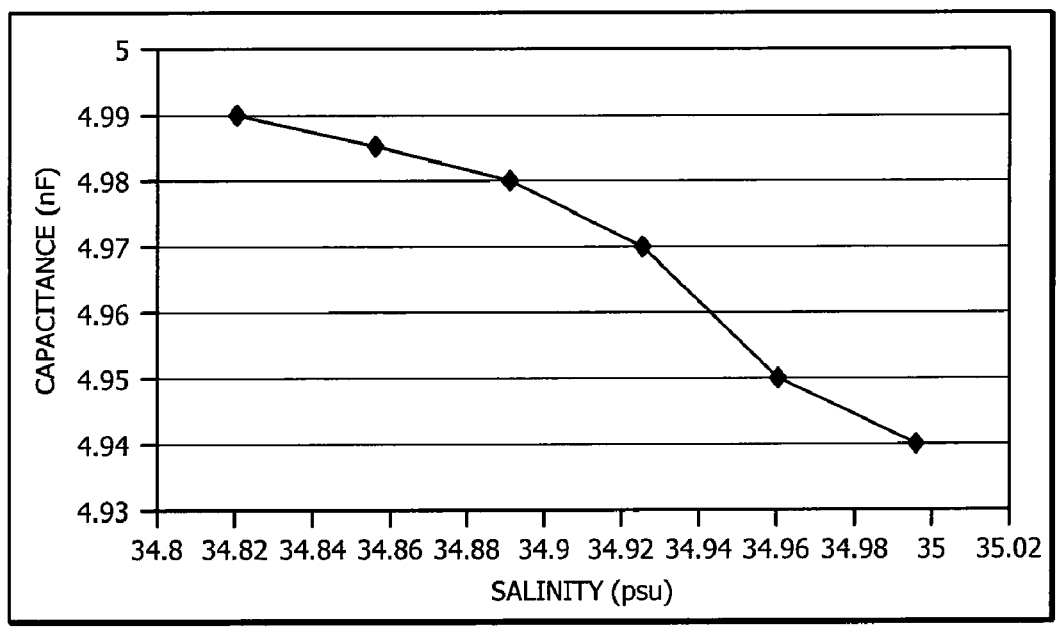
FIG. 6 is a plot of salinity versus capacitance at a frequency of 40 KHz, measured using an impedance analyzer.

Each of the components in the prototype CTD sensor were tested separately and compared with the simulation results. First, the conductivity sensor was tested with calibrated IAPSO Standard Sea Water from Ocean Scientific International, with a salinity of 34.996 psu. Using this sample solutions, varying concentrations were prepared by adding known quantities of water. Initially, the performance of the sensor was tested using an Agilent 4294A impedance analyzer. The phase compensation and cable calibration were performed to suppress the errors in measurement. The response of the capacitive sensor was observed to varying salinity concentrations. A plot of the salinity versus capacitance was plotted as shown in the FIG. 6 and shows a 0.2% change in capacitance for every 0.035 psu variation in concentration.

The design was optimized by simulating the capacitive arrangement using a finite element tool, FEMLAB. To obtain maximum fringe field minimization, the distance of spacing between the guard ring and the capacitor plate should be kept at a minimum. The capacitance was found to reduce, nearer to theoretical value with the addition of guard rings The gap between the guard ring and the capacitor plate was selected as 400 μm due to the fabrication limitations. A reduction of 5% in the capacitance was obtained with the addition of guard rings. This is attributed to the diversion of electric fields from the area of interest.

Figure 7:
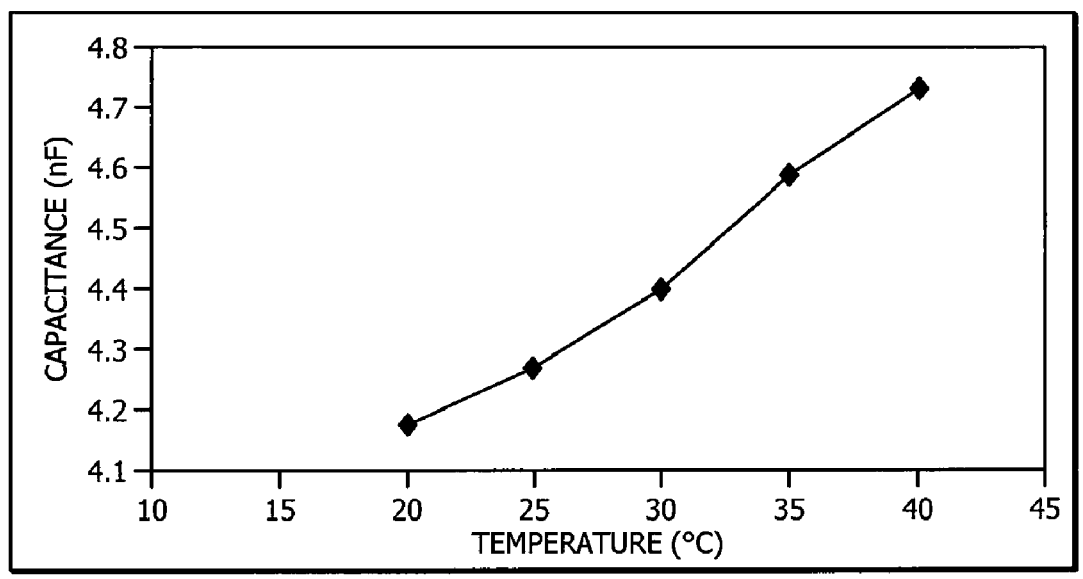
FIG. 7 is a plot of temperature versus sensor capacitance at constant salinity of 34.1868 psu.

It is known that the dielectric constant of a solution is a function of frequency, temperature and salinity of the solution. Hence, a plot of the sensor capacitance versus temperature for fixed concentration is important, as shown in FIG. 7. For every 5° C. change in solution temperature, the capacitance was observed to vary by 2% from its initial value.

Figure 8:
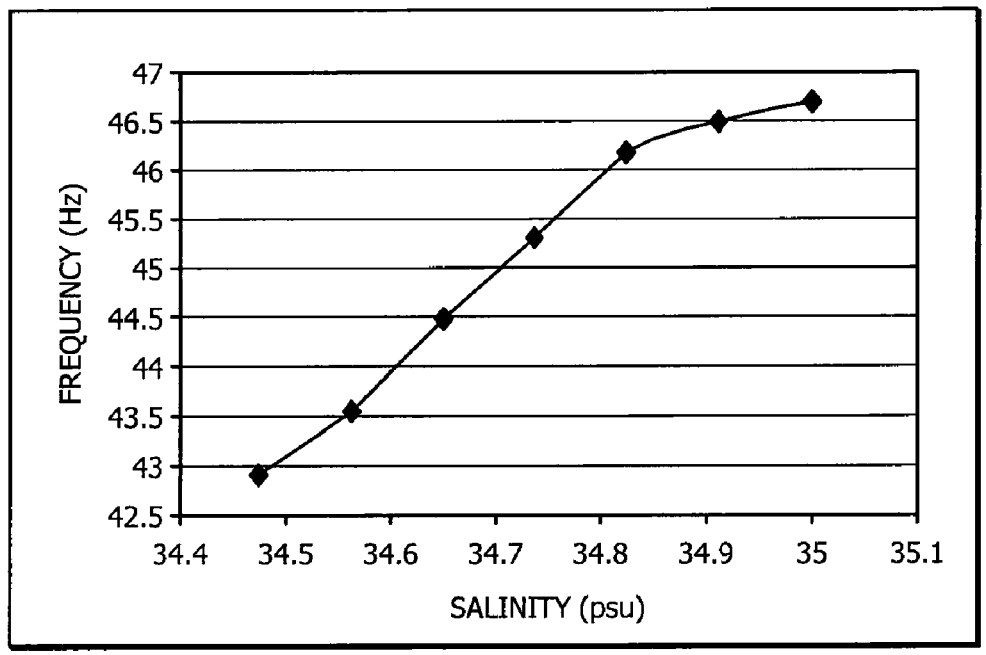
FIG. 8 is a plot of oscillator frequency versus salinity

Also, the variation of frequency of oscillation was measured for changes in salinity. FIG. 8 shows the plot of frequency and salinity of the solution. For every 0.0875 psu change in salinity, the frequency changed by 500 Hz.

Figure 9:
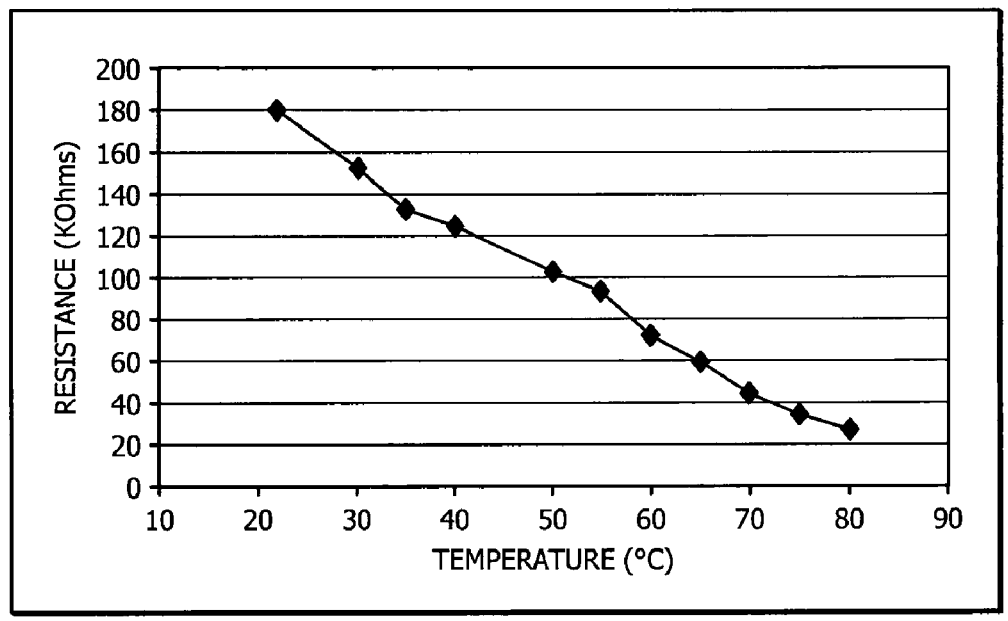
FIG. 9 is a plot showing the variation of resistance of the Au doped sensor with temperature.

The temperature sensor was tested in a controlled temperature environment. The sensor performance tests were performed to obtain resistance characteristics during temperature cycling. FIG. 9 shows the resistance-temperature characteristics for Au doped temperatures sensor. The resistance values are seen to linearly decrease with increase in temperature with a good resolution of 3 KΩ/° C.

Figure 10:
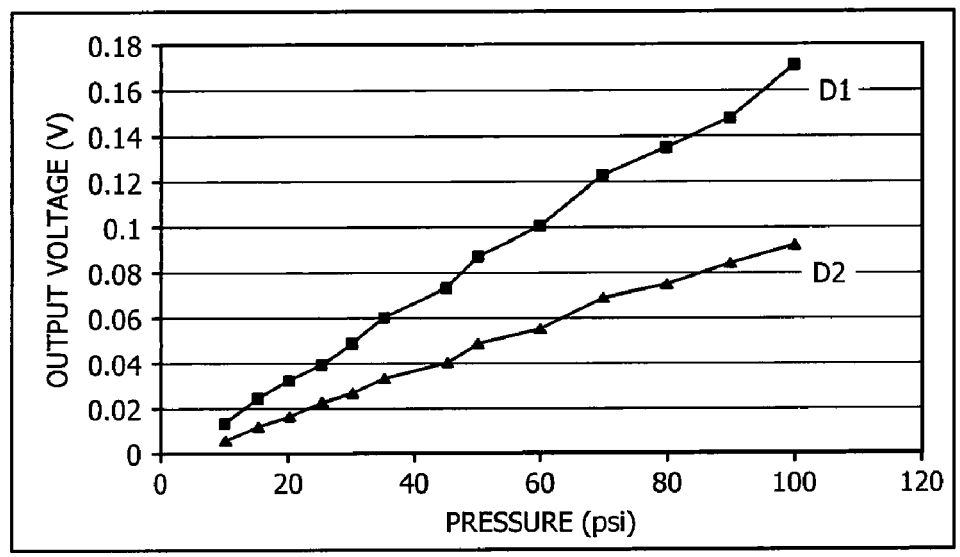
FIG. 10 is a plot showing output voltage in response to variation in pressure. (D1) 1500 μm in length, 35 μm thick, (D2) 1000 μm in length, 25 μm in width.

The pressure sensor was tested in a custom-built test setup for pressure ranges up to 500 m of water. The sensor input port was connected to the pressure inlet with provision for relief value to avoid excessive pressure buildup. Initial testing was performed on a prototype sensor built on square diaphragms: 1) 1500 μm in length, 30 μm thick, and 2) 1000 μm in length, 20 μm in thick. First, mechanical integrity tests were performed on the package to simulate the harsh ocean environment. The packaged sensor withstood pressures equivalent to 1000 m of water. FIG. 10 shows the plot of output voltage from the sensor in response to pressure variations.

In terms of pressure sensitivity, D1 and D2 are 0.012 mV/psi and 0.015 mV/psi respectively. The responses were further validated by simulation using a MEMS finite element tool, Coventorware®. The experimental results follow the same trend as the simulation results, The variation are mainly due to ideal conditions assumed in simulation such as straight diffusion profile, uniformity in bulk etching and exact placement of piezoresistors.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A multiple diaphragm piezoresistive pressure sensor for measuring a pressure of a liquid, the pressure sensor further comprising:
    an inner deformable diaphragm formed on a silicon substrate, the inner deformable diaphragm having a first thickness;
    an outer deformable diaphragm formed on the silicon substrate, the outer deformable diaphragm having a second thickness which is greater than the first thickness, positioned below the inner deformable diaphragm to support the inner deformable diaphragm;
    a first piezoresistive bridge embedded in the inner deformable diaphragm; and
    a second piezoresistive bridge embedded in the outer deformable diaphragm.

2. The pressure sensor of claim 1, wherein the inner deformable diaphragm is a shaped as a square.

3. The pressure sensor of claim 1, wherein the outer deformable diaphragm is a shaped as a square.

4. The pressure sensor of claim 1, wherein the inner deformable diaphragm has a dimension of between about 1000 μm×1000 μm and about 1500 μm×1500 μm.

5. The pressure sensor of claim 1, wherein the inner deformable diaphragm has a dimension of between about 2000 μm×2000 μm and 3000 μm×3000 μm.

6. The pressure sensor of claim 1, wherein the silicon substrate has a thickness of about 250 μm.

7. The pressure sensor of claim 1, wherein the first thickness is between about 5 μm and 25 μm.

8. The pressure sensor of claim 1, wherein the second thickness is between about 25 μm and 45 μm.

9. The pressure sensor of claim 1, wherein the ratio of the first thickness to the second thickness is greater than about 3.

10. The pressure sensor of claim 1, wherein the first piezoresistive bridge comprises four piezoresistors configured as a Wheatstone bridge.

11. The pressure sensor of claim 1, wherein the second piezoresistive bridge comprises four piezoresistors configured as a Wheatstone bridge.

12. The pressure sensor of claim 10, wherein the piezoresistors are small regions of silicon diffused with p-type or n-type elements to undergo a change in resistance due to the applied pressure on the inner diaphragm.

13. The pressure sensor of claim 11, wherein the piezoresistors are small regions of silicon diffused with p-type or n-type elements to undergo a change in resistance due to the applied pressure on the outer diaphragm.

14. The pressure sensor of claim 1, further comprising a third piezoresistive bridge embedded in the silicon substrate and positioned away from the outer diaphragm.

15. The pressure sensor of claim 14, wherein the third piezoresistive bridge comprises four piezoresistors configured as a Wheatstone bridge.

16. The pressure sensor of claim 15, wherein the piezoresistors are small regions of silicon diffused with p-type or n-type elements to compensate for temperature variations.

17. The pressure sensor of claim 1, further comprising an over-pressure glass cavity positioned over the diaphragms to provide a reference pressure chamber and to provide over-pressure protection for the diaphragms.

18. The pressure sensor of claim 1, further comprising electrical interconnections to the first piezoresistive bridge and the second piezoresistive bridge.

19. A multiple diaphragm piezoresistive pressure sensor for measuring a pressure of a liquid, the pressure sensor further comprising:
    an inner deformable diaphragm formed on a silicon substrate, the inner deformable diaphragm having a first thickness;
    an outer deformable diaphragm formed on the silicon substrate, the outer deformable diaphragm having a second thickness which is greater than the first thickness, positioned below the inner deformable diaphragm to support the inner deformable diaphragm;
    a first piezoresistive bridge embedded in the inner deformable diaphragm;
    a second piezoresistive bridge embedded in the outer deformable diaphragm; and
    a third piezoresistive bridge embedded in the silicon substrate.

20. The pressure sensor of claim 19, further comprising an over-pressure glass cavity positioned over the diaphragms to provide a reference pressure chamber and to provide over-pressure protection for the diaphragms.

21. The pressure sensor of claim 1, further comprising electrical interconnections to the first piezoresistive bridge, to the second piezoresistive bridge, and to the third piezoresistive bridge.

* * * * *

UNITED STATES PATENT AND TRADEMARK OFFICE
CERTIFICATE OF CORRECTION

| | | |
|---|---|---|
| PATENT NO. | : 7,856,885 B1 | |
| APPLICATION NO. | : 12/276465 | |
| DATED | : December 28, 2010 | |
| INVENTOR(S) | : Shekhar Bhansali and Lawrence C. Langebrake | |

It is certified that error appears in the above-identified patent and that said Letters Patent is hereby corrected as shown below:

On the Title Page,
Item [75], Inventor, please delete the following:

"Shreyas Bhat, Tampa FL (US)"

Signed and Sealed this
Eighth Day of March, 2011

David J. Kappos
*Director of the United States Patent and Trademark Office*